(12) United States Patent
Berkowitz et al.

(10) Patent No.: US 9,647,472 B2
(45) Date of Patent: May 9, 2017

(54) METHOD AND CIRCUITRY TO RECOVER ENERGY FROM DISCHARGE SIGNALS OF A CHARGING OPERATION OF A BATTERY/CELL

(71) Applicant: Qnovo Inc., Newark, CA (US)

(72) Inventors: Fred Berkowitz, Los Gatos, CA (US); Nadim Maluf, Los Altos, CA (US); Dania Ghantous, Walnut Creek, CA (US)

(73) Assignee: Qnovo Inc., Newark, CA (US)

( * ) Notice: Subject to any disclaimer, the term of this patent is extended or adjusted under 35 U.S.C. 154(b) by 254 days.

(21) Appl. No.: 14/552,319

(22) Filed: Nov. 24, 2014

(65) Prior Publication Data

US 2015/0077044 A1    Mar. 19, 2015

Related U.S. Application Data

(63) Continuation of application No. 13/171,612, filed on Jun. 29, 2011, now Pat. No. 8,901,886.

(60) Provisional application No. 61/360,048, filed on Jun. 30, 2010.

(51) Int. Cl.
*H02J 7/00* (2006.01)

(52) U.S. Cl.
CPC .......... *H02J 7/0042* (2013.01); *H02J 7/0052* (2013.01); *H02J 7/0073* (2013.01); *H02J 7/0093* (2013.01)

(58) Field of Classification Search
USPC ........................................................ 320/130
See application file for complete search history.

(56) References Cited

U.S. PATENT DOCUMENTS

| 8,901,886 | B2 | 12/2014 | Berkowitz et al. | |
| 2005/0194933 | A1* | 9/2005 | Arnold | H02J 7/0077 320/128 |
| 2009/0102422 | A1 | 4/2009 | Naganuma et al. | |
| 2009/0140694 | A1 | 6/2009 | Zeng | |
| 2009/0251103 | A1* | 10/2009 | Yamamoto | B60K 6/48 320/133 |

* cited by examiner

*Primary Examiner* — Robert Grant
(74) *Attorney, Agent, or Firm* — Weaver Austin Villeneuve & Sampson LLP

(57) ABSTRACT

Circuitry and methods to "capture", recover, store and/or use electrical energy output and/or generated by the battery/cell as discharge signals of a charging sequence/operation. Such electrical energy may then be "reused" by the charging circuitry or system and/or in the system powered by the battery/cell and/or external to the charging circuitry or battery/cell. The energy output and/or generated by the battery/cell in response to discharge signals of a charging sequence/operation may (1) supply energy to the associated system being powered by the battery, (2) supply charge current to the same battery/cell or another battery/cell, (3) supply charge to one or more cells in a multiple cell battery pack that are at a lower voltage than the other cells, (4) store the charge in a different charge storing device (e.g., a capacitor and/or second battery), and/or (5) heat a battery/cell to improve charging performance.

22 Claims, 17 Drawing Sheets

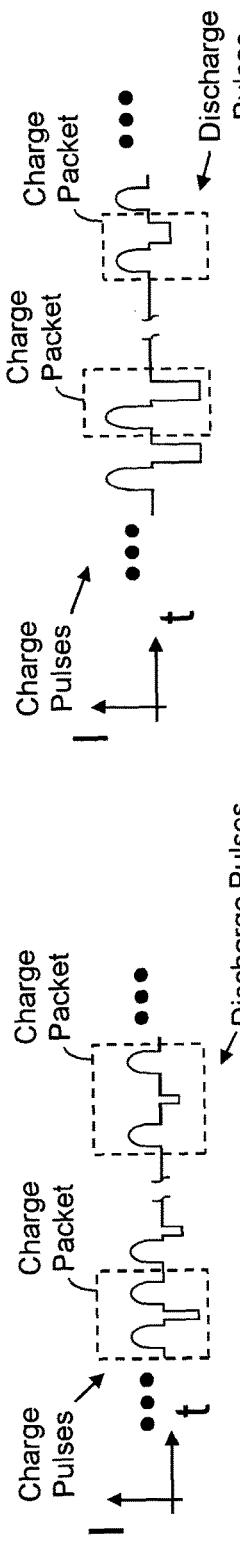
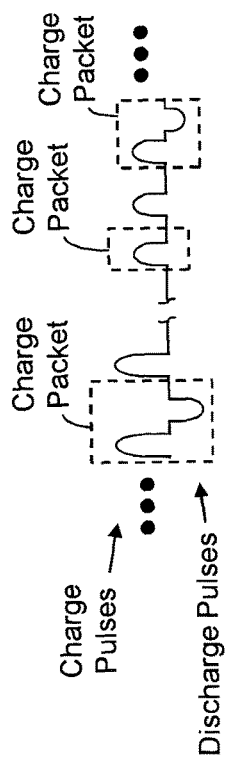
FIGURE 3A
FIGURE 3B
FIGURE 3C
FIGURE 3D
FIGURE 3E

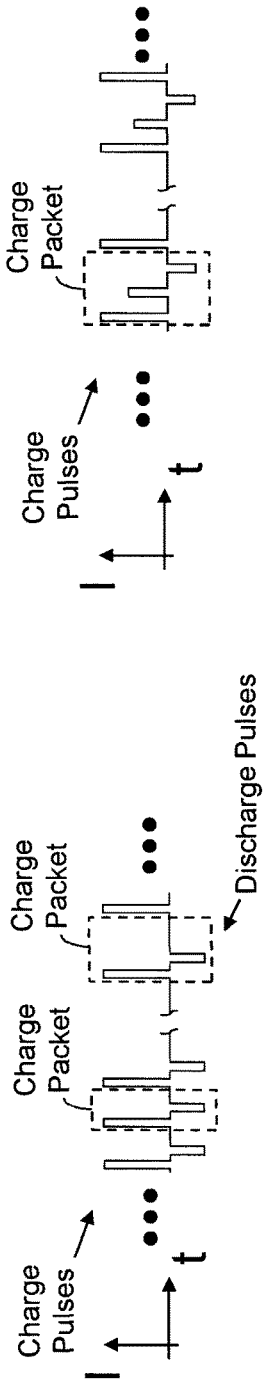
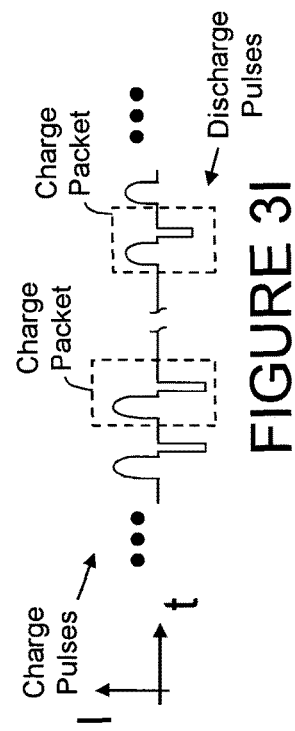
FIGURE 3F
FIGURE 3G
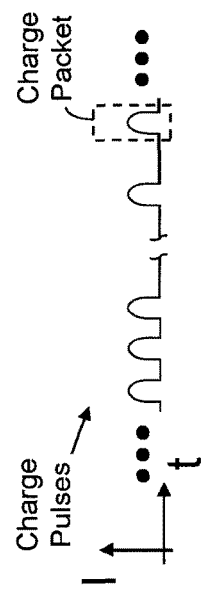
FIGURE 3H
FIGURE 3I
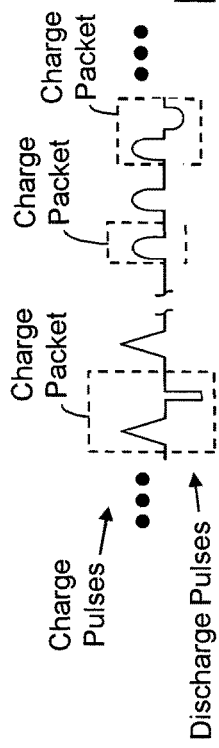
FIGURE 3J

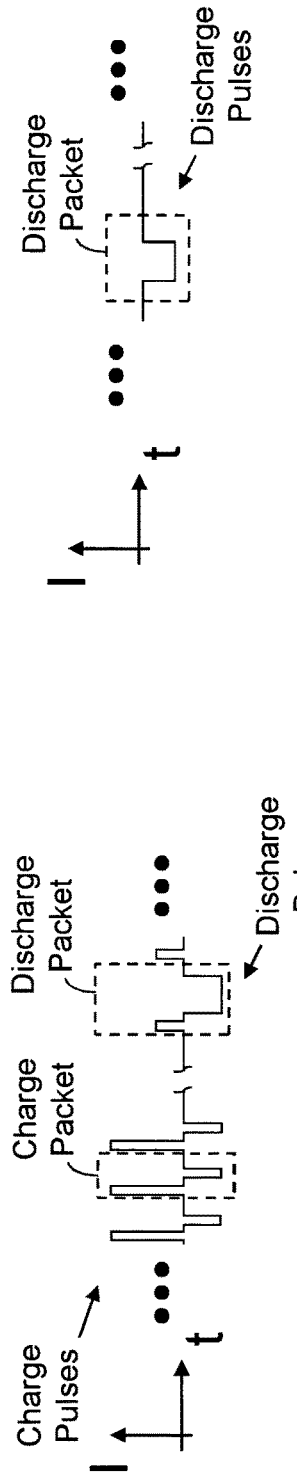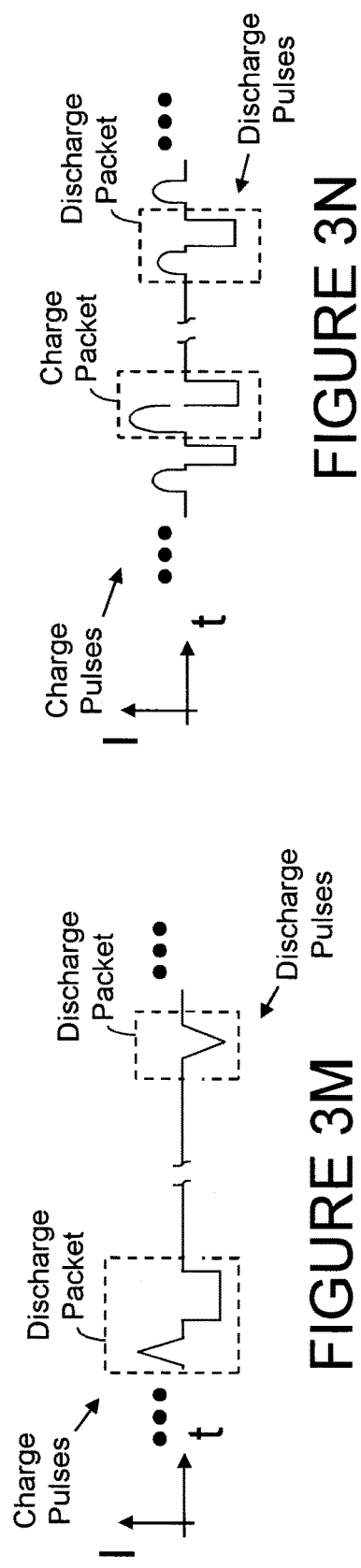
FIGURE 3K
FIGURE 3L
FIGURE 3M
FIGURE 3N

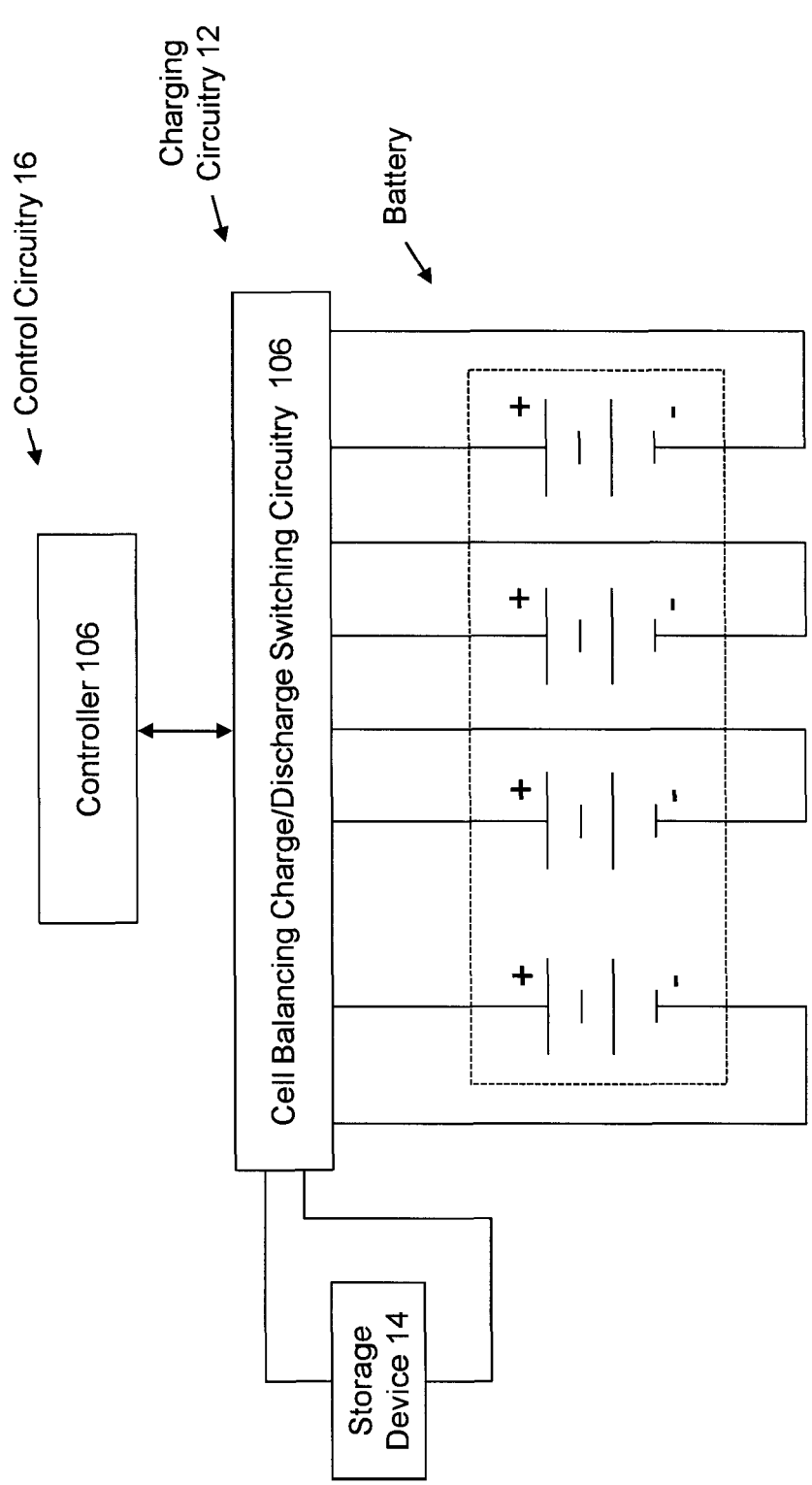

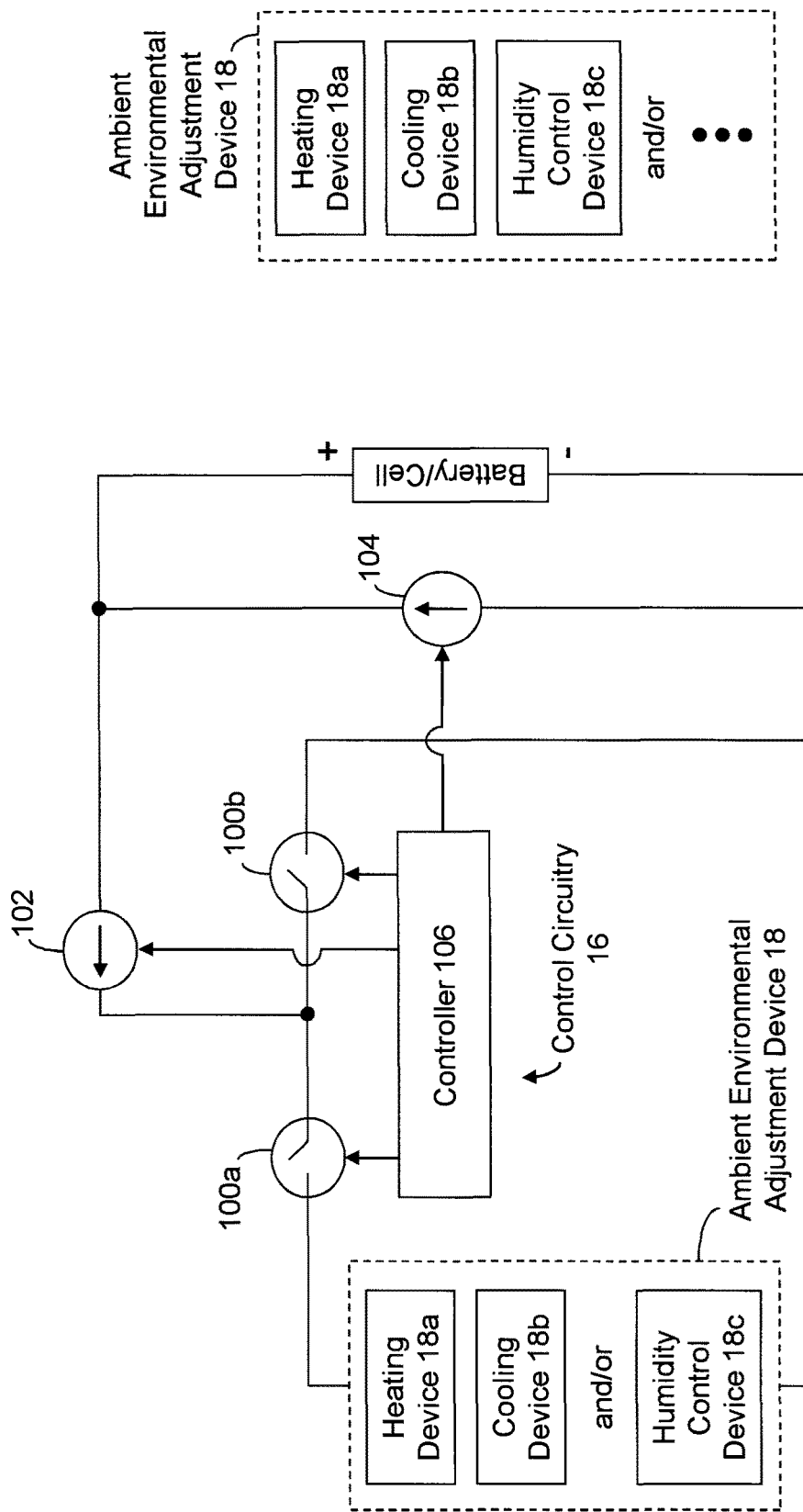

METHOD AND CIRCUITRY TO RECOVER ENERGY FROM DISCHARGE SIGNALS OF A CHARGING OPERATION OF A BATTERY/CELL

RELATED APPLICATIONS

This application is a continuation of U.S. application Ser. No. 13/171,612 (U.S. Pat. No. 8,901,886) entitled "Method and Circuitry to Recover Energy from Discharge Signals of a Charging Operation of a Battery/Cell", filed Jun. 29, 2011. This application and the '612 application claim priority to U.S. Provisional Application No. 61/360,048, entitled "Recovery of Energy from Discharge Pulses", filed Jun. 30, 2010, which is incorporated herein by reference in their entirety.

INTRODUCTION

The present inventions are directed to employing electrical energy output, provided and/or released by a battery/cell in response to discharge signals of a charging or recharging sequence, operation or cycle. In one embodiment, the electrical output, provided and/or released by the battery in response to one or more discharge signals of a charging sequence or operation is stored in an electrical energy storage device which may be (1) supplied or output to the associated system being powered by the battery, (2) supplied or output to charge the same battery or different battery, (3) supplied or output to cells in a multiple cell battery pack that are at a lower voltage than the other cells (commonly referred to as "cell balancing"), (4) supplied or output to charge a different charge storing device (for example, a capacitor and/or different or second battery/cell), and/or (5) supplied or output to an ambient environmental adjust (AEA) device, for example, a heating device to heat a "cold" battery for improved charging performance.

Briefly, pulse charging protocols for batteries may include positive (charge) pulses and negative (discharge) pulses. Typically, the energy released in response to or during a discharge pulse is dissipated by the charging circuitry as heat. The present inventions, however, are directed to recovering and/or using this energy by, for example, storing it in an electrical storage device (such as a capacitor and/or another or second battery/cell), which may then be "reused" by the charger circuit or in the system powered by the battery. In addition thereto, or in lieu thereof, the recovered energy may also be directed to an ambient environmental adjust device to adjust ambient conditions (e.g., a heating device that warms a battery) for improved charging performance.

SUMMARY

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Importantly, this Summary may not be reflective of or correlate to the inventions protected by the claims in this or continuation/divisional applications hereof. Even where this Summary is reflective of or correlates to the inventions protected by the claims hereof, this Summary is not be exhaustive of the scope of the present inventions.

In one aspect, the present inventions are directed to a circuitry and methods to "capture", recover, store and/or use electrical energy output, generated and/or provided by the battery/cell in response to discharge signals of a charging or recharging sequence, operation or cycle, for example, storing such energy in an electrical storage device (such as a capacitor and/or another battery/cell). Such electrical energy may then be "reused" by the charging circuitry or system and/or in the system powered by the battery/cell and/or external to the charging circuitry or battery/cell. In one embodiment, the energy output, generated, provided and/or released by the battery/cell in response to discharge signals of a charging sequence or operation may 1) supply energy to the associated system being powered by the battery, 2) supply charge current to the same battery/cell or another battery/cell, 3) supply charge to cells in a multiple cell battery pack that are at a lower voltage than the other cells (commonly referred to as "cell balancing"), 4) store the charge in a different charge storing device (for example, a capacitor and/or different battery), and/or 5) heat a battery to improve charging performance.

Notably, this application describes and/or illustrates certain exemplary embodiments of energy "reuse" from the negative pulses of a charging sequence or operation. While certain embodiments, features, attributes and advantages of the inventions are described and illustrated, it should be understood that many others, as well as different and/or similar embodiments, features, attributes and advantages of the present inventions, are apparent from the description and illustrations. These embodiments are not mutually exclusive, and, as such, one, some or all of them can be employed in a battery powered system. Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other embodiments of the present inventions.

As stated herein, there are many inventions, and aspects of the inventions, described and illustrated herein. This Summary is not exhaustive of the scope of the present inventions. Indeed, this Summary may not be reflective of or correlate to the inventions protected by the claims in this or continuation/divisional applications hereof.

Moreover, this Summary is not intended to be limiting of the inventions or the claims (whether the currently presented claims or claims of a divisional/continuation application) and should not be interpreted in that manner. While certain embodiments have been described and/or outlined in this Summary, it should be understood that the present inventions are not limited to such embodiments, description and/or outline, nor are the claims limited in such a manner (which should also not be interpreted as being limited by this Summary).

Indeed, many other aspects, inventions and embodiments, which may be different from and/or similar to, the aspects, inventions and embodiments presented in this Summary, will be apparent from the description, illustrations and claims, which follow. In addition, although various features, attributes and advantages have been described in this Summary and/or are apparent in light thereof, it should be understood that such features, attributes and advantages are not required whether in one, some or all of the embodiments of the present inventions and, indeed, need not be present in any of the embodiments of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or devices in different figures are labeled similarly. It is understood that various combinations of the structures, components, and/or devices, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

FIGS. 1A-1D illustrate block diagram representations of exemplary charging circuitry, a battery/cell and energy storage device (for example, a capacitor and/or another battery/cell), which stores electrical energy output, generated and/or provided by the battery/cell in response to discharge signals of a charging or recharging sequence, operation or cycle, according to at least certain aspects of certain embodiments of the present inventions, wherein FIG. 1A illustrates the option (indicated by the dotted line) of electrically coupling the storage device to an external system or external circuitry to provide energy thereto, and FIG. 1B includes control circuitry coupled to the charging circuitry and the storage device, as well as the option (indicated by the dotted line) of electrically coupling the storage device to an external system or external circuitry to provide energy thereto, and FIG. 1C illustrates the storage device adapted and coupled to provide electrical energy to the charging circuitry (for application to the battery/cell), and FIG. 1D illustrates the storage device adapted and coupled to provide electrical energy to the charging circuitry under control from/by the control circuitry;

FIGS. 3A-3N illustrate exemplary charge and/or discharge packets of the charging and discharging signals (which are exemplary illustrated in FIGS. 2A-2D), wherein such charge and discharge packets may include one or more charge pulses and one or more discharge pulses; notably, in one embodiment, each charge signal of FIGS. 2A-2D may include a plurality of packets (for example, about 100 to about 50,000 packets) and, in one embodiment, each packet may include a plurality of charge pulses, discharge pulses and rest periods; notably, the pulses may be any shape (for example, rectangular, triangle, sinusoidal or square); in one exemplary embodiment, the charge and/or discharge pulses of the packet may include a temporal duration of between about 1 ms to about 500 ms, and preferably less than 50 ms; moreover, as discussed in detail below, one, some or all of the characteristics of the charge and discharge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combination or permutations of pulse, pulse characteristics, periods, packets and signal characteristics and configurations are intended to fall within the scope of the present inventions;

FIG. 6 illustrates in block diagram form an exemplary charging circuitry, batteries/cells, storage device, switch circuitry and control circuitry (including, in this exemplary embodiment a microcontroller) wherein the electrical energy output and/or generated by the batteries/cells in response to one or more discharge signals of a charging or recharging sequence, operation or cycle, is provided to and/or stored in the storage device, according to at least certain aspects of certain embodiments of the present inventions, wherein the control circuitry couples the storage device of this embodiment to one or more of the cells to implement cell balancing wherein the switching circuitry, in response to control signals from the control circuitry, electrically couples the storage device to one or more of the cells (for example, one or more cells that are at a lower voltage relative to the other cells) to provide charge to such one or more cells before, during and/or after the charging or recharging sequence, operation or cycle;

FIG. 7B illustrates in circuit and block diagram form an exemplary charging circuitry, a battery/cell, ambient environment adjustment device (which in this embodiment, may be a heating device, a cooling device and/or a humidity control device) and control circuitry, according to at least certain aspects of certain embodiments of the present inventions, wherein the electrical energy output and/or generated by the battery/cell in response to one or more discharge signals of a charging or recharging sequence, operation or cycle, is provided to the ambient environment adjustment device, wherein the ambient environment adjustment device, in response to the electrical energy is adapted or configured to adjust the ambient environmental conditions in relation to the battery/cell;

FIG. 8 illustrates in block diagram form an exemplary ambient environment adjustment device, according to at least certain aspects of certain embodiments of the present inventions.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

In a first aspect, the present inventions are directed to circuitry and/or techniques to "capture", use, recover, store, use and/or "reuse" electrical energy output, generated and/or provided by the battery/cell in response to discharge signals of a charging or recharging sequence, operation or cycle, for example, storing such energy in an electrical storage device (such as a capacitor and/or another battery/cell). Such electrical energy may then be used or "reused" by the charging circuitry, in the system powered by the battery/cell, and/or by an external (or second) system or battery/cell. For example, in one embodiment, the energy output, generated, provided and/or released by the battery/cell in response to discharge signals of a charging sequence or operation may (1) supply energy to the associated system being powered by the battery, (2) supply charge current to the same battery/cell or another battery/cell, (3) supply charge to cells in a multiple cell battery pack that are at a lower voltage than the other cells (commonly referred to as "cell balancing"), (4) store the charge in a different charge storing device (for example, a capacitor and/or different battery), and/or (5) adjust the ambient conditions of the battery/cell to manage, control and/or enhance the charging performance of the battery/cell (for example, heat the battery/cell and/or adjust the ambient heat/humidity conditions for improved charging performance).

Figure 1A:
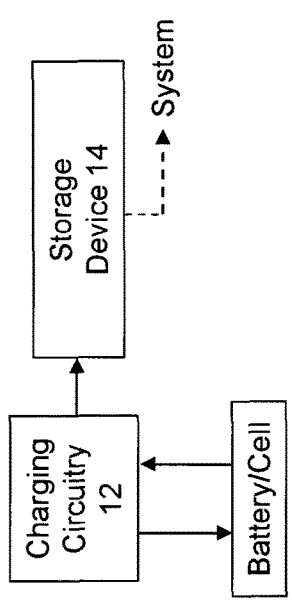

With reference to FIG. 1A, in one embodiment, the present inventions include charging circuitry 12 and storage device 14. In this exemplary embodiment, electrical energy output, generated and/or provided by the battery/cell, in response to the discharge signals, is stored in storage device 14 (for example, capacitor and/or battery). In one embodiment, charging circuitry 12 includes one or more current sources. In addition thereto, or in lieu thereof, charging circuitry 12 includes one or more voltage sources. The charging circuitry may employ any charging sequence, now known or later developed, to charge the battery/cell; moreover, the present inventions may employ any charging circuitry 12, now known or later developed, to charge the battery/cell; all such charging techniques and charging circuitry are intended to fall within the scope of the present inventions.

Figure 2B:
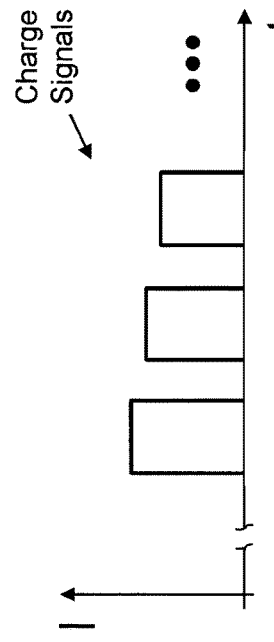
FIGS. 2A-2D illustrate exemplary waveforms illustrating a plurality of exemplary charge signals and discharge signals of an exemplary charging technique, wherein such charge signals may be constant, fixed, programmable and/or adapted, for example, generally decrease according to a predetermined rate and/or pattern (for example, asymptotically, linearly or quadratically) as the terminal voltage of the battery/cell increases during a charging or recharging sequence, operation or cycle (see, FIGS. 2B and 2D); notably, charge signals (inject or apply charge into the battery/cell) and discharge signals (remove charge from the battery/cell)
Figure 2D:
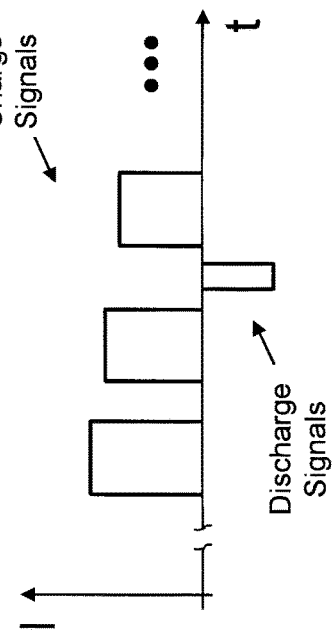
Figure 2A:
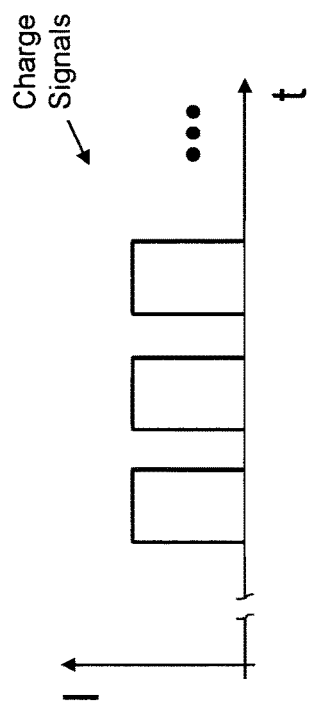
Figure 2C:
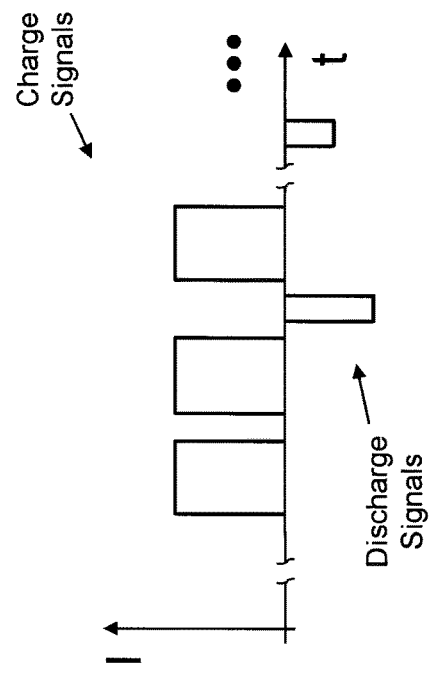

Briefly, in one embodiment, charging circuitry 12 applies charge signals to the battery/cell during the charging or recharging sequence, operation or cycle. (See, FIGS. 2A and 2B). In another embodiment, charging circuitry 12 applies charge signals and discharge signals. (See, FIGS. 2C and 2D). The charge signals inject or apply charge into the battery/cell and discharge signals remove charge from the battery/cell. The charge and/or discharge signals may include fixed characteristics, variable characteristics, programmable characteristics and/or adapted characteristics. For example, charge signals and/or discharge signals may generally decrease according to a predetermined rate and/or pattern (for example, asymptotically, linearly or quadratically), for example, as the terminal voltage of the battery/cell increases during a charging or recharging sequence, operation or cycle. (See, FIGS. 2B and 2D).

In one embodiment, charging circuitry 12 generates charge signals including one or more charge pulses (See, FIGS. 3A-3K, 3M and 3N). The charge signals may also include one or more discharge pulses. (See, FIGS. 3C-3G and 3I-3N). The charge circuitry 12 may generate discharge signals including one or more discharge pulses. The discharge pulse may also include one or more charge pulses. (See, FIGS. 3C-3G, 3M and 3N).

The charging circuitry 12 may generate charging and discharging signals, packets and pulses as described herein and described in more detail in U.S. patent application Ser. No. 12/111,902, "Method and Circuitry to Adaptively Charge a Battery/Cell", Inventors: Maluf et al., filed May 19, 2011, the contents of which are incorporated by reference. (See, FIGS. 3A-3N). In this regard, the charge and discharge signals may include a plurality of charge packets wherein each charge packet includes one or more charge pulses and, at times, one or more discharge pulses. (See, for example, FIGS. 3A-3J). The charge and discharge signals may also include one or more discharge packets wherein each discharge charge packet includes one or more discharge pulses. (See, FIGS. 3K-3N). Indeed, the charge and discharge signals may also include charge packets and one or more discharge packets wherein each charge packet and discharge packet includes one or more charge pulses and/or one or more discharge pulses. (See, FIGS. 3K and 3N).

In one embodiment, the charge and discharge signals generated, output and/or applied by the current charging circuitry to the battery/cell may be characterized as including a plurality of packets (for example, about 1,000 to about 50,000 packets—depending on the initial state of charge (SOC) of the battery/cell and the final SOC of the battery/cell), wherein each packet includes a plurality of current pulses (for example, 1 to about 50 pulses in each packet). (See, FIG. 3A-3K wherein the illustrative exemplary packets depict various characteristics (for example, a programmable number of pulses, pulse shapes, sequence, combination and/or spacing of charge and discharge pulses, pulse widths and/or duty cycles)). The charge pulses and discharge pulses may be any shape (for example, rectangular, triangle, sinusoidal or square). (See, for example, FIGS. 19A-19D and 20A-20D of U.S. patent application Ser. No. 12/111,902, "Method and Circuitry to Adaptively Charge a Battery/Cell", Inventors: Maluf et al., filed May 19, 2011). Moreover, the current or charge pulses may include charging and discharging pulses (each having fixed, programmable, adaptable and/or controllable shapes, pulse widths and/or duty cycles). (See, for example, FIGS. 3C-3G).

With continued reference to FIG. 1A, storage device 14 stores the electrical energy or charge output, generated and/or provided by the battery/cell, in response to one or more discharge pulses. The storage device 14 may be a capacitor, battery/cell and/or any device, now known or later developed, which stores an electrical energy/charge. Indeed, all types of electrical energy devices, capacitors and batteries/cells, whether now known or later developed, are intended to fall within the scope of the present inventions.

Figure 4A:
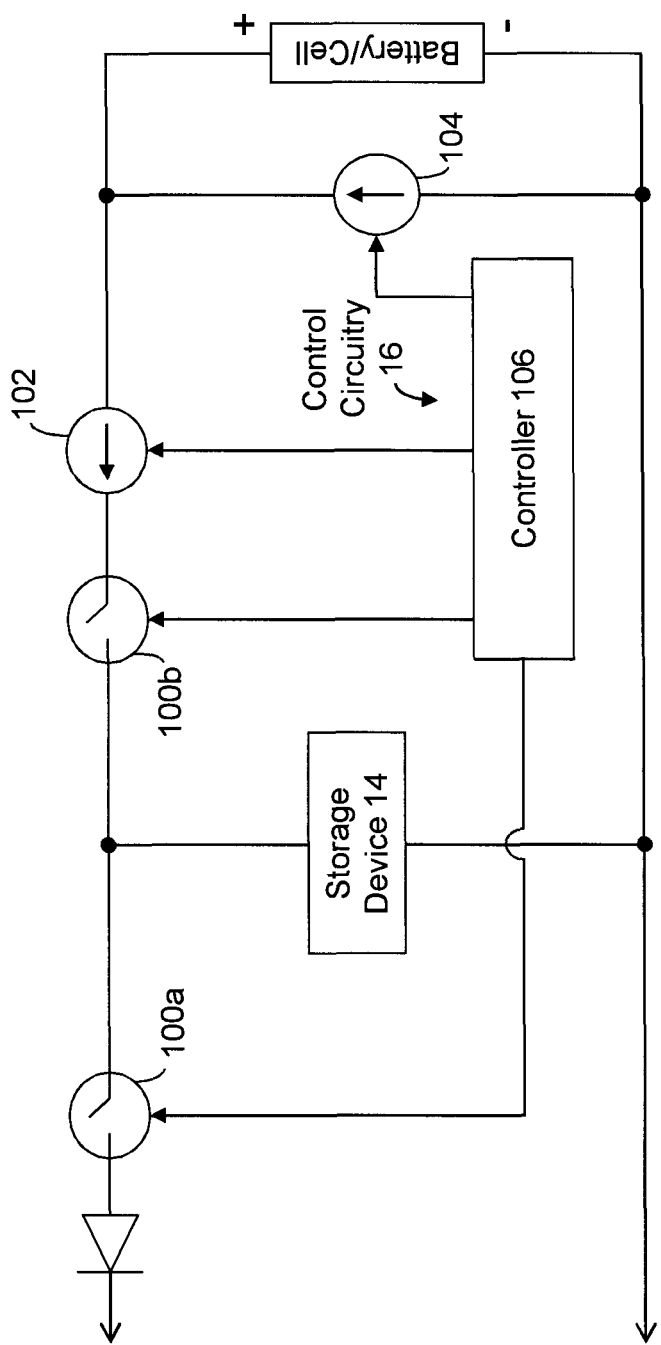
FIGS. 4A and 4B illustrate, in schematic block diagram form, exemplary charging circuitry, a battery/cell, storage device, switch circuitry and control circuitry (including, in this exemplary embodiment a microcontroller) wherein the electrical energy output and/or generated by the battery/cell in response to one or more discharge signals of a charging or recharging sequence, operation or cycle, is provided to and/or stored in the storage device, according to at least certain aspects of certain embodiments of the present inventions, wherein, in the illustrative embodiment of FIG. 4A, the storage device of this embodiment is adapted or configured to provide electrical energy to an external system or circuitry, and, in the illustrative embodiment of FIG. 4B, the output of the storage device is coupled, via switch circuitry, to a voltage regulator which resides within, for example, the device being powered by the battery/cell.
Figure 4B:
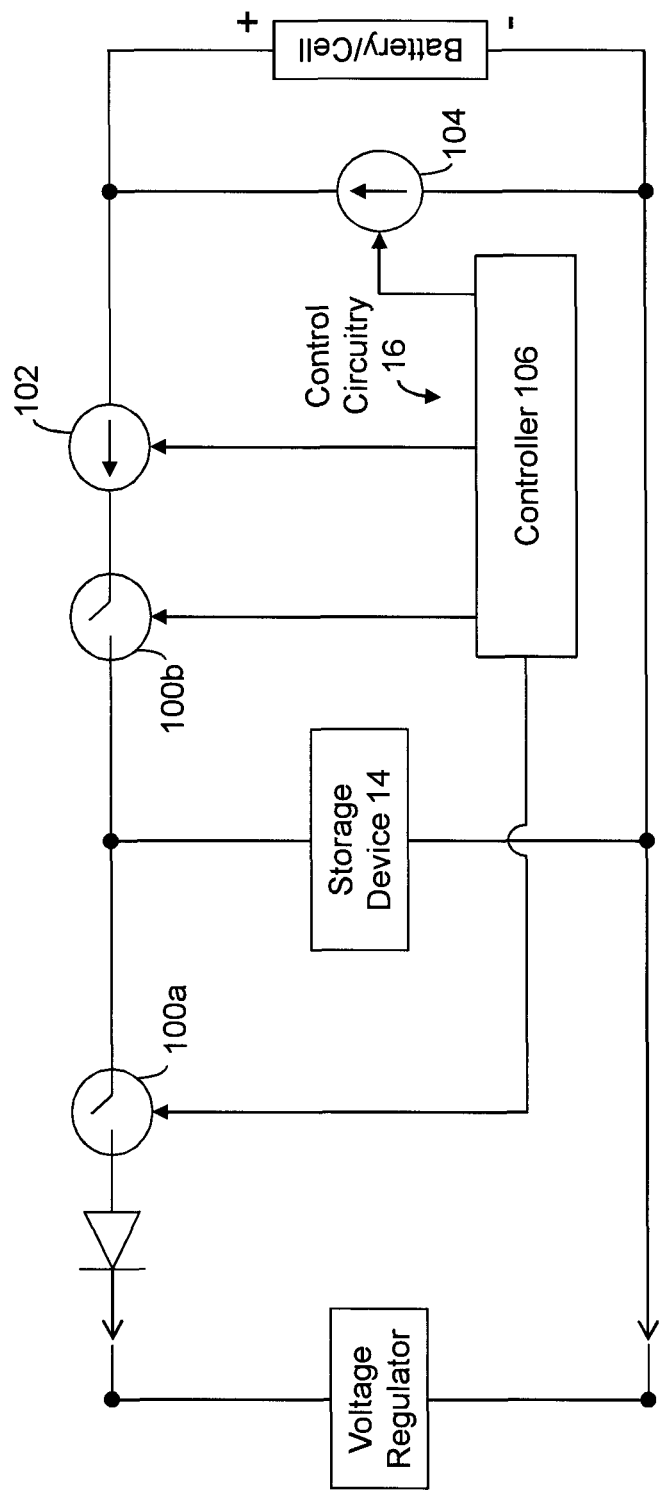

In one embodiment, storage device 14 is coupled to circuitry to output the stored electrical energy to, for example, the system in which it is incorporated and/or an external or separate system or device. For example, with reference to FIG. 4, in one embodiment, storage device 14 may be is connected to the input of a voltage regulator, via switching circuit 100a, to output a regulated voltage. In this embodiment, during application of a discharge pulse, switching circuit 100b directs the discharge current from battery/cell into storage device 14. Here, current sink 102 "generates" the discharge signal wherein, in response, the battery/cell outputs, supplies, generates and/or provides electrical energy to storage device 14. Notably, the current sink 102 may be programmable to, for example, facilitate adjusting the characteristics of the discharge signal (for example, to implement adaptive charging of the battery/cell).

Figure 1B:
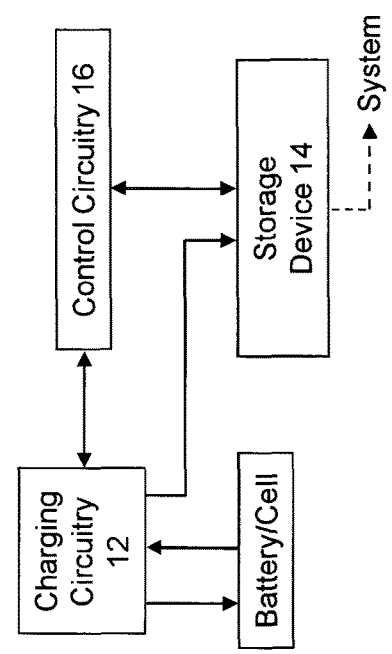

The charging sequence (including one or more discharging signals or pulses) may be controlled or managed by control circuitry 16. (See, for example, FIG. 1B). The control circuitry 16 (which, in this illustrative embodiment of FIG. 4, includes controller) selectively couples the battery/cell to storage device 14 during application of one or more discharge signals via closing switch 100b to provide or supply electrical energy output, generated and/or provided by the battery/cell in response to discharge signals of a charging or recharging sequence to storage device 14. Similarly, control circuitry 16 selectively couples storage device 14 to the system powered by the battery/cell, and/or by an external (or second) system or battery/cell via closing switch 100a. As such, by opening and closing switches 100a and 100b, control circuitry 16 may control or manage (i) the storage of electrical energy output, generated, provided and/or released by the battery/cell in response to discharge signals or pulses of a charging sequence or operation (via control of programmable current sink 102) and (ii) the energy output by storage device 14, for example, the amount and/or timing of the energy "reuse" of electrical energy to, for example, the associated system being powered by the battery/cell and/or supply of electrical energy to the another system or battery/cell.

Notably, control circuitry 16 may also manage and/or control application of the charge signals to battery/cell. In this regard, with continued reference to FIG. 4, in one embodiment, control circuitry 16 may control programmable current source 104. Where control circuitry 16 implements an adaptive charging technique, control circuitry 16 may calculate, determine and/or assess the state or condition of the battery/cell in connection with the charging or recharging process and, in response, adapts the charging or recharging process. For example, control circuitry 16 may calculate, determine and/or implement a charging sequence or profile (including the characteristics of the charge and discharge pulses) based on or using one or more of the adaptive charging techniques and algorithms described and/or illustrated in U.S. patent application Ser. No. 12/111,902, "Method and Circuitry to Adaptively Charge a Battery/Cell", Inventors: Maluf et al., filed May 19, 2011. As such, in this embodiment, control circuitry 16 may adapt, adjust and/or control one or more characteristics of the charge or current removed from the battery/cell, via controlling current sink 102, and adapt, adjust and/or control one or more characteristics of the charge or current applied to or injected into the battery/cell, via controlling current source 104.

Notably, control circuitry 16 may include one or more processors/controllers, one or more state machines, one or more gate arrays, programmable gate arrays and/or field programmable gate arrays, and/or a combination thereof. Indeed, control circuitry and monitoring circuitry may share circuitry with each other as well as with other elements; such circuitry may be distributed among a plurality of integrated circuits which may also perform one or more other operations, which may be separate and distinct from that described herein. Moreover, control circuitry 16 may perform or execute one or more applications, routines, programs and/or data structures that implement particular methods, techniques, tasks or operations described and illustrated herein. The functionality of the applications, routines or programs may be combined or distributed. In addition, the applications, routines or programs may be implemented by control circuitry 16 using any programming language whether now known or later developed, including, for example, assembly, FORTRAN, C, C++, and BASIC, whether compiled or uncompiled code; all of which are intended to fall within the scope of the present inventions.

Figure 1E:
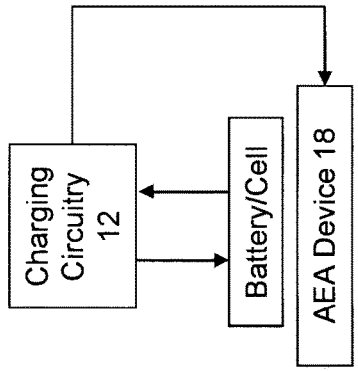
FIGS. 1E-1H illustrate block diagram representations of exemplary charging circuitry, a battery/cell and heating device wherein the electrical energy output, generated and/or provided by the battery/cell in response to one or more discharge signals (of a charging) of a charging or recharging sequence, operation or cycle, is provided to the heating device to, for example, apply heat to the battery/cell and/or the ambient environment, according to at least certain aspects of certain embodiments of the present inventions, wherein FIG. 1F includes an energy storage device (for example, a capacitor and/or another battery/cell), which stores energy generated or provided by the battery/cell in response to discharge signals of a charging or recharging sequence, operation or cycle, for use by the heating device, and FIG. 1G includes an energy storage device which stores energy generated or provided by the battery/cell in response to discharge signals of a charging or recharging sequence, operation or cycle, for use by the heating device and/or an external system or circuitry, and FIG. 1H includes an storage device adapted and coupled to provide electrical energy to the charging circuitry and/or the heating device, under control from/by the control circuitry.
Figure 1F:
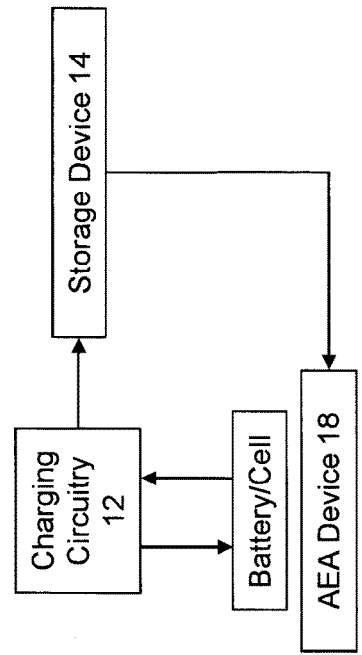
Figure 1C:
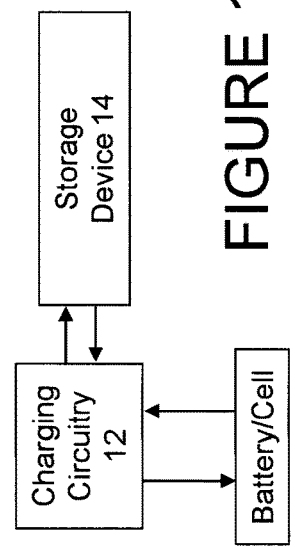
Figure 5:
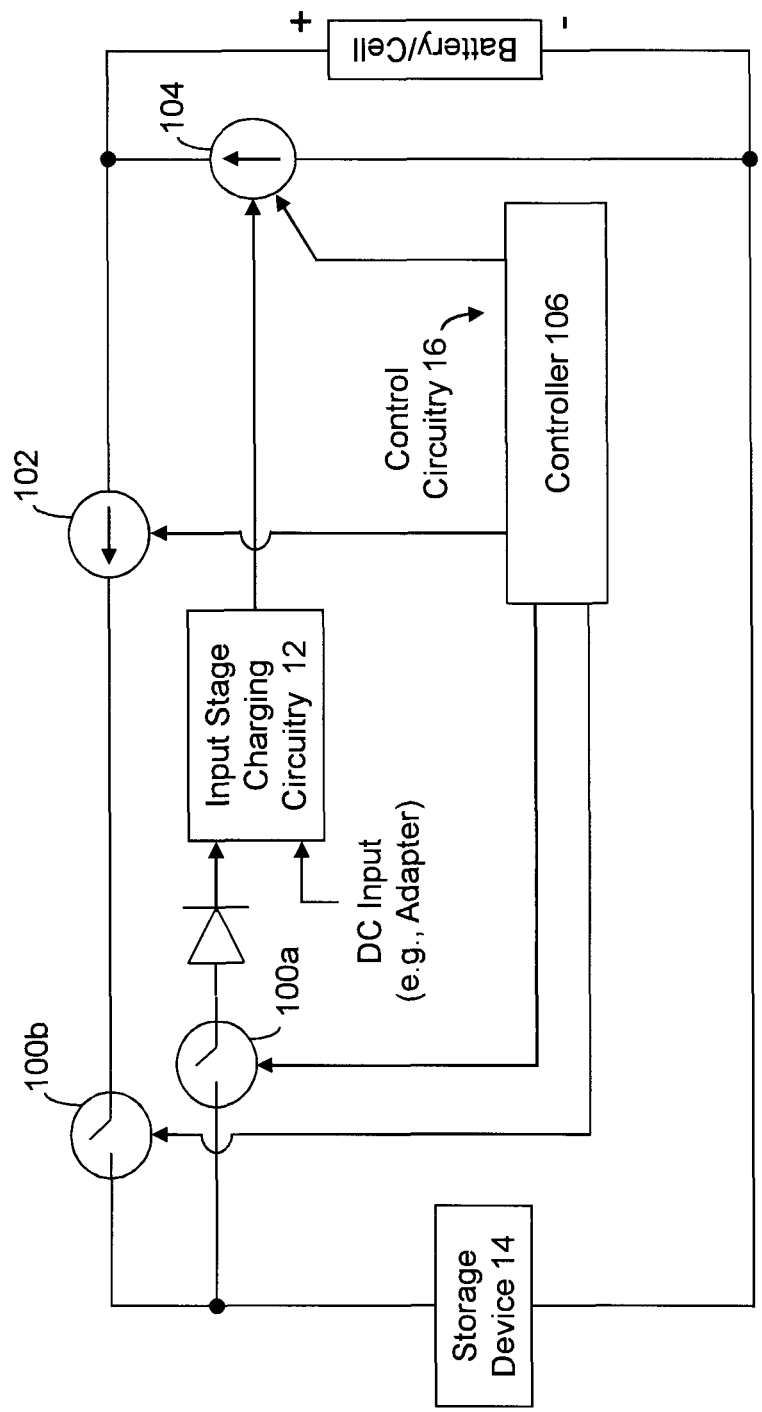
FIG. 5 illustrates in schematic block diagram form an exemplary charging circuitry, a battery/cell, storage device, switch circuitry and control circuitry (including, in this exemplary embodiment a microcontroller) wherein the electrical energy output and/or generated by the battery/cell in response to one or more discharge signals of a charging or recharging sequence, operation or cycle, is provided to and/or stored in the storage device and subsequently applied to the battery/cell in the same or a different charging and/or recharging sequence, operation or cycle, according to at least certain aspects of certain embodiments of the present inventions.

In another embodiment, the energy output, generated, provided and/or released by the battery/cell in response to discharge signals of a charging sequence or operation may be stored in the storage device and thereafter employed to charge the same battery/cell or another battery/cell, In this regard, the energy output by the battery, in response to the discharge pulses, is stored in an electrical storage device, where the storage device is coupled to the input of a battery charger circuit (resident in the device or another/different device) via a switching circuit. With reference to FIGS. 1C and 5, in one embodiment, storage device 14 may be selectively connected to the input of charging circuitry 12, via switch circuit 100*a*. The input stage of charging circuitry 12, along with current source 104, is coupled to the battery/cell to implement the charging process, sequence or operation.

In this embodiment, in operation, control circuitry 16 (again, exemplary illustrated as a controller) instructs current sink to "generate" a discharge signal wherein, in response, the battery/cell outputs, supplies, generates and/or provides electrical energy to storage device 14 via switch circuit 100*b*. In this regard, the switch circuitry 100*b* directs the discharge current from battery/cell into storage device 14. Notably, as in the previous embodiment, current sink 102 may be programmable to, for example, facilitate adaptive charging of the battery/cell Again, the charging sequence (including one or more discharging signals or pulses) may be controlled or managed by control circuitry 16. The control circuitry 16 selectively couples the battery/cell to storage device 14 during application of one or more discharge signals, via closing switch 100*b*, to provide or supply electrical energy output, generated and/or provided by the battery/cell in response to discharge signals of a charging or recharging sequence to storage device 14. The control circuitry 16 may also selectively couple storage device 14 to charging circuitry 12, via closing switch 100*a* to provide or output the electrical energy stored in storage device 14 to charging circuitry 12 for use in charging or recharging the battery/cell. As such, by opening and closing switches 100*a* and 100*b*, control circuitry 16 may control or manage (i) the storage of electrical energy output, generated, provided and/or released by the battery/cell in response to discharge signals or pulses of a charging sequence or operation (via control of programmable current sink 102) and (ii) the energy output by storage device 14 and "reuse" by charging circuitry 12 during the charging sequence, cycle or operation of the battery/cell.

Figure 1D:
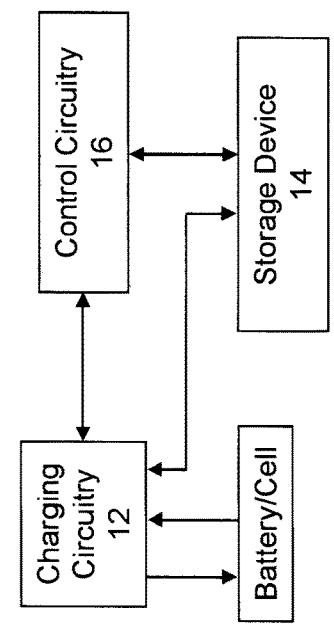

In another embodiment of the present inventions, energy output, generated, provided and/or released by the battery/cell in response to discharge signals of a charging sequence or operation may be employed to balance the voltages of a multi-cell battery by supplying or providing charge to one or more cells of the multiple cell battery pack that are at a lower voltage than other cells of the multiple cell battery pack. With reference to FIGS. 1D and 6, in one embodiment, storage device 14 may be selectively connected to one or more of the individual cells of the multi-battery pack via cell balancing charge/discharge switching circuitry 106 (which includes one or more switches). Here, in operation, switching circuit 106 electrically couples the battery to storage device 14 to receive and store energy output, generated, provided and/or released by the battery/cell in response to discharge signals of a charging sequence or operation. Thereafter, switching circuit 106 electrically connects the storage device to one or more of the cells of a multi-battery pack based on, for example, the voltage of the cells.

In one embodiment, control circuitry 16 (illustrated in this exemplary embodiment as a controller) may control the cell balancing operation. In this regard, control circuitry 16 determines or assesses which of cell or cells of the battery is at a voltage which is different from the voltage of the other cells. In response to determining or assessing a cell(s) having a voltage which is lower than one or more of the other cells of the battery, the control circuitry 16 configures switching circuitry 106 of charging circuitry 12 to electrically couple storage device 14 to the cell(s) having the lower voltage and thereby provide additional charge to that cell(s).

Figure 9A:
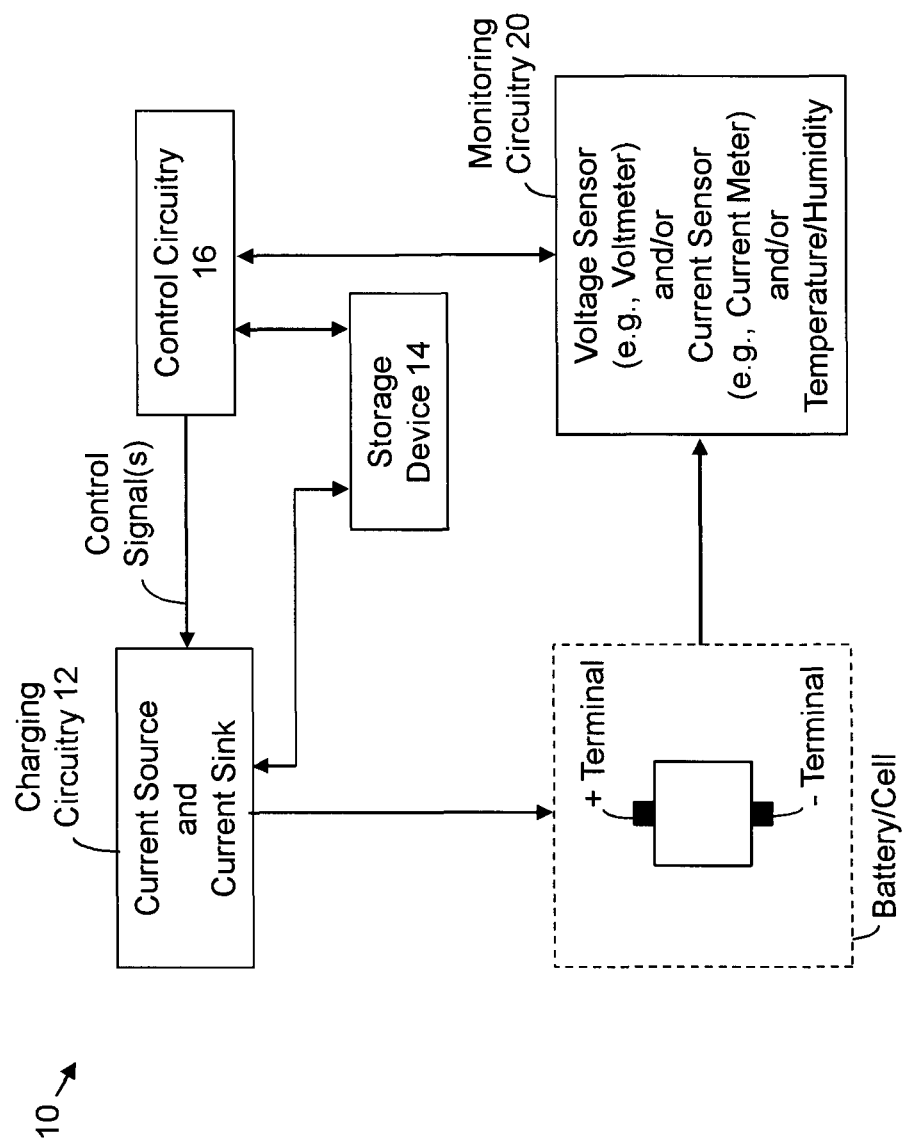
FIG. 9A-9C illustrates, in block diagram form, exemplary adaptive charging circuitry in conjunction with a battery/cell (which may include two terminals (for example, positive and negative terminals), according to at least certain aspects of certain embodiments of the present inventions, wherein in this embodiment, the charging circuitry may include voltage source and/or current source, and the monitoring circuitry may include voltage and/or current sensors (for example, a voltmeter and/or a current meter), and wherein the adaptive charging circuitry may also include (i) a storage device to store electrical energy output and/or generated by the battery/cell, in response to one or more discharge signals (of a charging) of a charging or recharging sequence, operation or cycle (FIGS. 9A and 9C), and/or (ii) an ambient environmental adjust device to adjust, control and/or maintain an ambient environment of the battery/cell during a charging or recharging sequence, operation or cycle (for example, a heating device to heat to the battery/cell to a desired and/or predetermined temperature during the charging or recharging sequence) (FIGS. 9B and 9C).
Figure 9B:
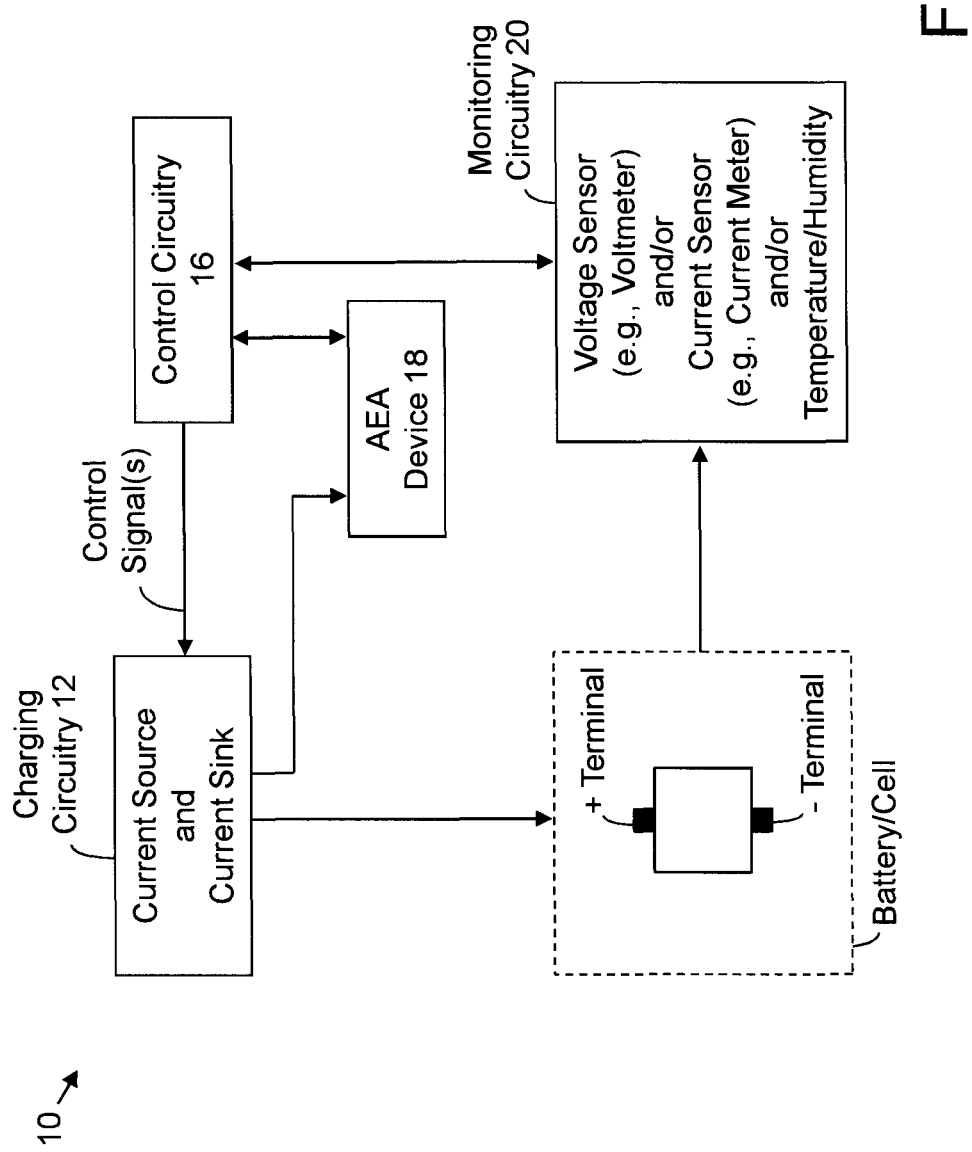
Figure 9C:
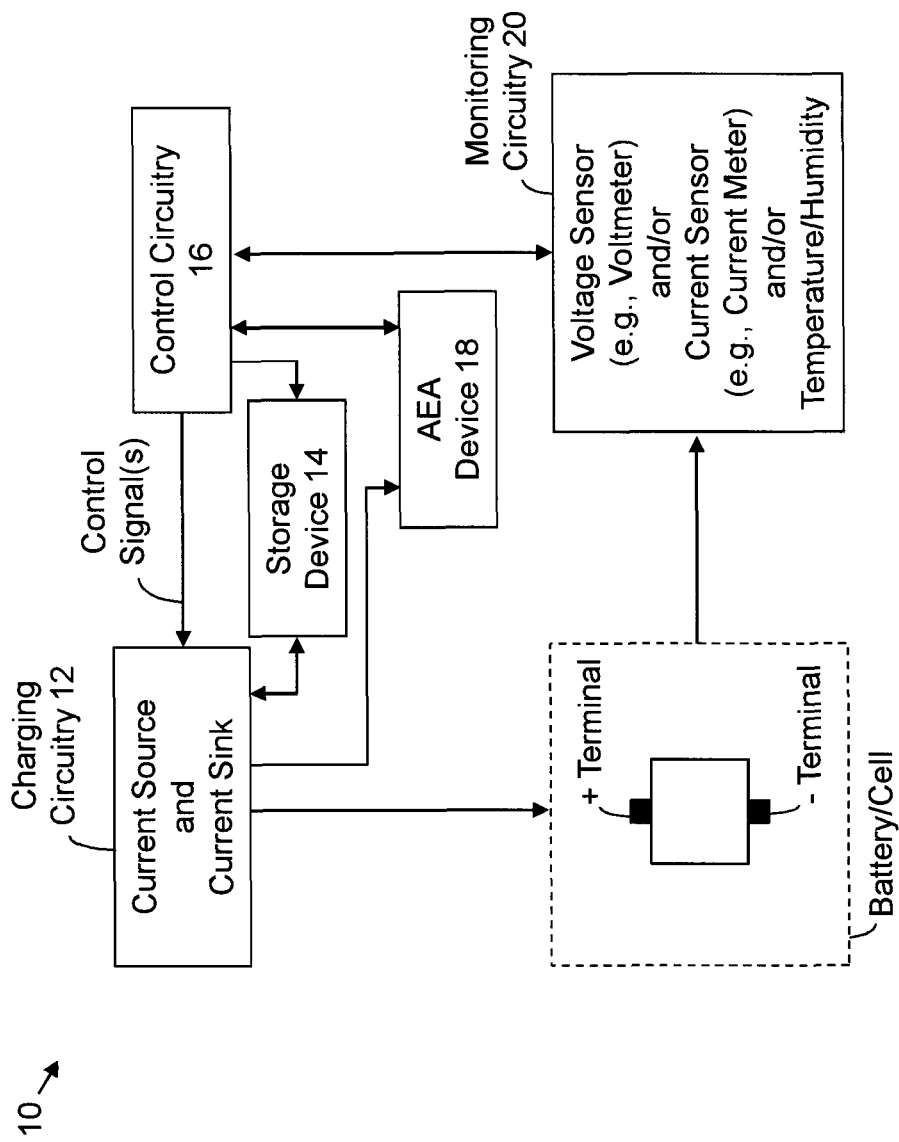

The control circuitry 16 may implement rebalancing operations intermittently, periodically or continuously. In one embodiment, the system includes monitoring circuitry to determine the terminal voltages of the plurality of cells of the battery. In one embodiment, the monitoring circuitry includes one or more sensors including, for example, a sensor to determine a voltage (for example, a voltmeter) and/or a sensor to determine a current (for example, a current meter). (See, for example, FIGS. 9A-9C). The monitoring circuitry is coupled to the control circuitry to provide data which is representative of the voltage of one or more of the cells of the multi-cell battery. In operation, the monitoring circuitry provides such data to control circuitry 16, which determines whether any of the cells is to be balanced. Where one or more cells is to be balanced, the control circuitry 16 configures switching circuitry 106 of charging circuitry 12 to electrically couple storage device 14 to the cell(s) having the lower voltage and thereby provide additional charge to that cell(s). Notably, as discussed in more detail below, the monitoring circuitry may also include sensors to determine the temperature of the battery/cell and/or ambient environmental conditions.

Notably, any circuitry or technique, whether now known or later developed, that determines which cell or cells (of the plurality of cells of the battery pack) is at a lower or the lowest voltage, may be employed in conjunction with this embodiment. All such circuitry and techniques are intended to fall within the scope of the present inventions.

Figure 7A:
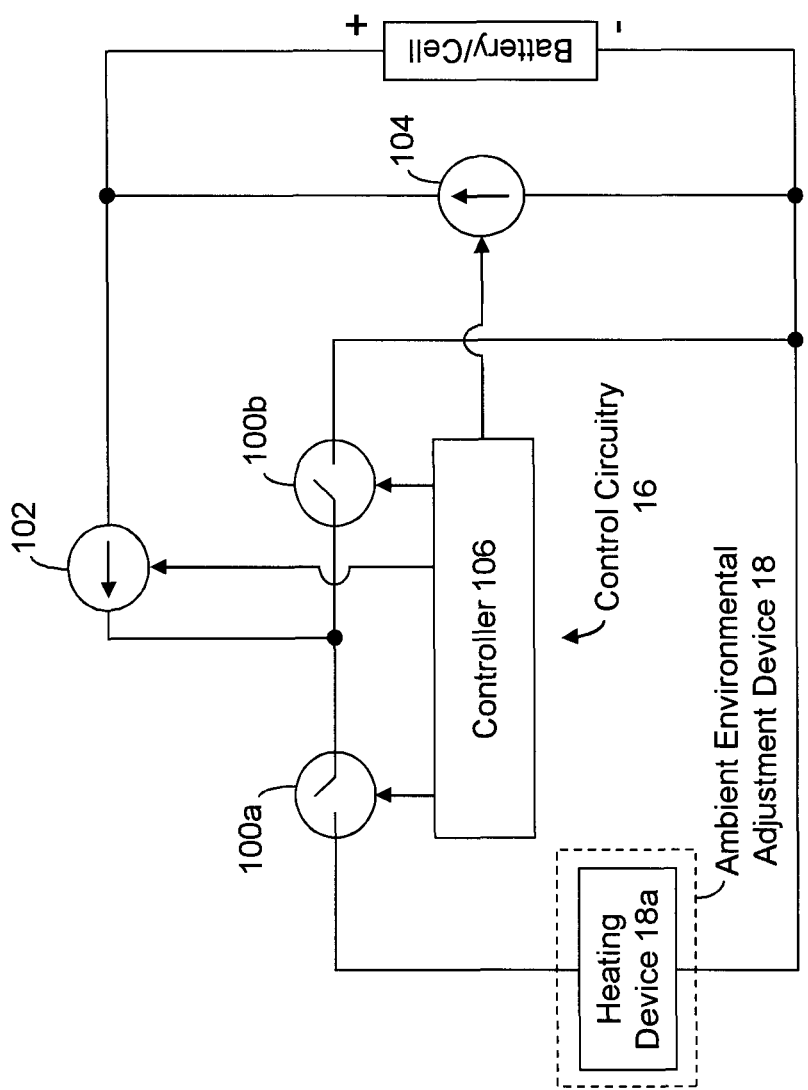
FIG. 7A illustrates in circuit and block diagram form an exemplary charging circuitry, a battery/cell, ambient environment adjustment device (which in this embodiment, is a heating device) and control circuitry (including, in this exemplary embodiment a microcontroller), according to at least certain aspects of certain embodiments of the present inventions, wherein the electrical energy output and/or generated by the battery/cell in response to one or more discharge signals of a charging or recharging sequence, operation or cycle, is provided to the heating device, wherein the heating device, in response to the electrical energy is adapted or configured to heat to the battery/cell and/or the ambient environment.

In another embodiment of the present inventions, energy output, generated, provided and/or released by the battery/cell in response to discharge signals of a charging sequence or operation may be employed to adjust the ambient environmental conditions and/or the temperature of the battery/cell. With reference to FIGS. 1E and 7, in one embodiment, energy output by the battery in response to a discharge pulse is directed via a switching circuit to an ambient environmental adjustment device (for example, an electric powered heating device and/or humidity control device) which is environmentally coupled and/or attached to the battery/cell. Here, in operation, ambient environmental adjustment device 18 may be selectively connected to the charging circuitry 12 to receive energy output, generated, provided and/or released by the battery/cell in response to discharge signals of a charging sequence or operation.

With reference to FIG. 7, in operation, control circuitry 16 (again, exemplary illustrated as a controller) instructs current sink to "generate" a discharge signal wherein, in response, the battery/cell outputs, supplies, generates and/or provides electrical energy to environmental adjustment device 18 (which, in this embodiment, includes heating device 18a) via switch circuit 100a. As in the previous embodiment, current sink 102 may be programmable to, for example, facilitate adaptive charging of the battery/cell. In one embodiment, if the temperature of the battery/cell is below a predetermined threshold, the energy output by the battery/cell in response to a discharge pulse is provided to heating device 18, which, in response, generates heat and thereby increases the temperature of the battery. Once the battery/cell attains a certain or predetermined temperature (via, for example, monitoring circuitry and/or control circuitry), switch circuit 100a is opened and switch circuit 100b is closed thereby discontinuing providing electrical power to heating device 18a.

Indeed, in one embodiment, the temperature of the battery/cell may be monitored (for example, continuously or periodically) and where the temperature drops below a certain or predetermined temperature (for example, a desired or optimum charging temperature), the heating device may be "re-engaged" by directing electric power to the heating device (via closing switch circuit 100a and opening switch circuit 100b). (See, for example, FIGS. 7A and 7B). In addition, in another embodiment, where the temperature exceeds a certain or predetermined temperature (for example, a desired or maximum charging temperature), cooling device 18b may be "re-engaged" by directing electric power to the cool device (via closing switch circuit 100a and opening switch circuit 100b). (See, for example, FIG. 7B). In yet another embodiment, where the humidity exceeds a certain or predetermined range of humidity (for example, a maximum or minimum charging humidity), humidity control device 18c (for example, a humidifier or dehumidifier) may be "re-engaged" by directing electric power thereto (via closing switch circuit 100a and opening switch circuit 100b). (See, for example, FIG. 7B).

The environmental adjustment device may include one or more heating devices, one or more humidity control devices and/or one or more cooling devices. (See, for example, FIG. 8). The heating device may employ convection and/or conduction type heating. In one embodiment, the heating device is a resistor which converts electricity to heat.

Notably, because the ability of the battery/cell to accept charge without impact to cycle life (where cycle life is defined as the usable number of charge/discharge cycles) is inversely proportional to its temperature, an embodiment which controls the temperature of the battery/cell may extend the cycle life of the battery/cell. In this regard, increasing or decreasing the temperature of the battery may mitigate the reduction in cycle life due to charging the battery at low temperature.

The present inventions may be implemented in conjunction with any charging or recharging sequence, operation or cycle and/or circuitry. For example, with reference to FIGS. 9A-9C, system 10 may implement an adaptive charging technique and include charging circuitry 12, storage device 14 (FIGS. 9A and 9C), control circuitry 16, ambient environment adjustment device 18 (FIGS. 9B and 9C) and monitoring circuitry 20. The charging system may implement one or more of the adaptive charging techniques described and/or illustrated in U.S. patent application Ser. No. 12/111,902, "Method and Circuitry to Adaptively Charge a Battery/Cell", Inventors: Maluf et al., filed May 19, 2011, the contents of which are incorporated by reference.

Briefly, monitoring circuitry 20 may monitor voltage, current and/or ambient environment conditions relating to the battery/cell (or the specific conditions of the battery/cell, for example, the temperature of the battery). With continued reference to FIGS. 9A-9C, in one embodiment, the charging system includes, monitoring circuitry 20 which measures, monitors, senses, detects and/or samples, on an intermittent, continuous and/or periodic basis, condition or characteristics of the battery/cell including, for example, the terminal voltage, battery/cell charging current, temperature of the battery/cell, and/or environmental conditions of the system and/or battery/cell (for example, the ambient temperature and/or humidity). The monitoring circuitry 20 and/or measuring or monitoring techniques, whether described herein, now known or later developed, to acquire data corresponding or relating to condition or characteristics of the battery/cell and/or the ambient environmental conditions or characteristics; all such monitoring circuitry 20 and measuring or monitoring techniques are intended to fall within the scope of the present inventions.

In one embodiment, monitoring circuitry 20 includes one or more sensors including, for example, a sensor to determine a voltage (for example, a voltmeter), a sensor to determine a current (for example, a current meter). (See, for example, FIGS. 9A-9C). In addition thereto, or in lieu thereof, monitoring circuitry 20 may include sensors to determine the temperature of the battery/cell and/or ambient environmental conditions. Thus, in one embodiment, monitoring circuitry 20 may include (in addition to or in lieu of a sensor to determine a voltage (for example, a voltmeter) and/or a sensor to determine a current (for example, a current meter)) one or more temperature sensors which is/are thermally coupled to the battery/cell to generate, measure and/or provide data which is representative of the temperature of the battery/cell. In another embodiment, monitoring circuitry 20 may include (in addition to or in lieu of a sensor to determine a voltage and/or current, one or more temperature and/or humidity sensors which detect the temperature and humidity of the ambient environment of the battery/cell to generate, measure and/or provide data which is representative of the temperature and humidity of the battery/cell.

As such, in one embodiment, monitoring circuitry 20 provides data which is representative of the condition or characteristics of the battery/cell and/or ambient environmental conditions of the system and/or battery/cell to control circuitry 16. The control circuitry 16 may, in response to such data, control or manage the charging or recharging sequence, operation or cycle corresponding to the battery/cell. In the context of this invention, control circuitry 16 may control or manage the circuitry of the charging system to "capture", use, recover, store, use and/or "reuse" electrical energy output, generated and/or provided by the battery/cell in response to discharge pulses of a charging or recharging sequence, operation or cycle, for example, storing such energy in an electrical storage element (such as a capacitor and/or another battery/cell). In addition thereto, control circuitry 16 may also control or manage the use or "reuse" of such electrical energy. That is, control circuitry 16 may control or manage the energy output, generated, provided and/or released by the battery/cell in response to discharge pulses of a charging sequence or operation. For example, control circuitry 16 may control or manage the storage of such electrical energy, any cell balancing using such electrical energy and/or control of the ambient conditions of the battery/cell (to, for example, adjust, manage, control and/or enhance the charging performance of the battery/cell—for example, heat the battery/cell and/or adjust the ambient heat/humidity conditions for improved charging performance).

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

Notably, this application describes and/or illustrates certain exemplary embodiments of energy "reuse" from the negative signals or pulses of a charging sequence or operation. While certain embodiments, features, attributes and advantages of the inventions are described and illustrated, it should be understood that many others, as well as different and/or similar embodiments, features, attributes and advantages of the present inventions, are apparent from the description and illustrations. These embodiments are not mutually exclusive, and, as such, one, some or all of them can be employed in a battery powered system.

Figure 1G:
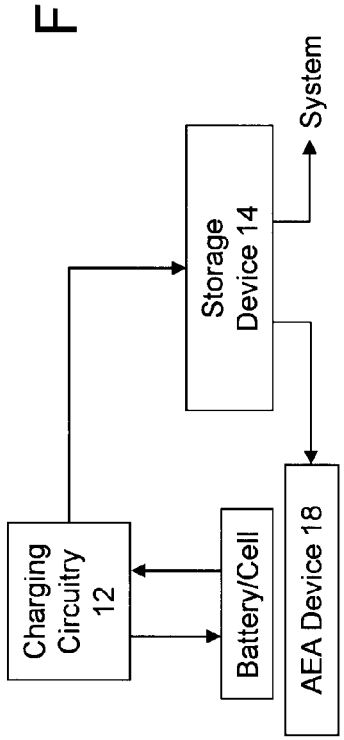
Figure 1H:
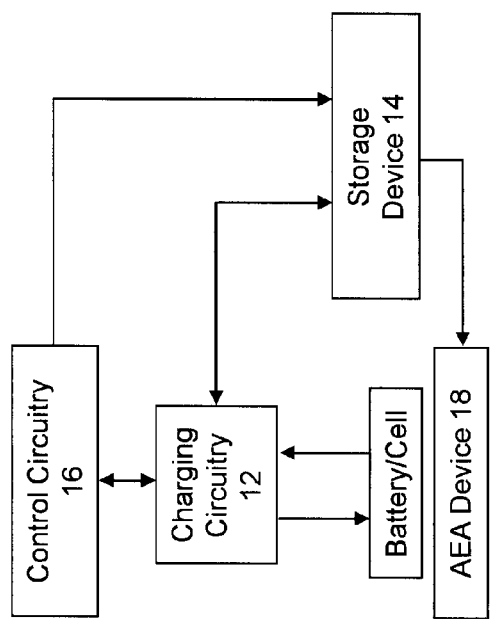
Figure 1I:
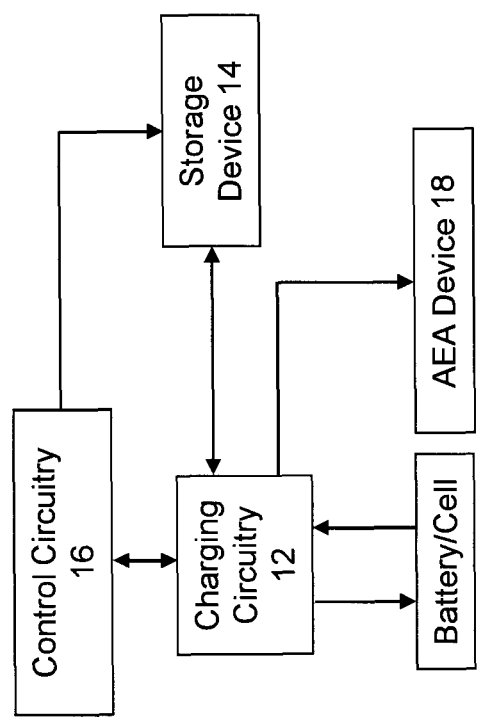
FIG. 1I illustrates a block diagram representation of an exemplary charging circuitry, a battery/cell and storage device wherein the electrical energy output and/or generated by the battery/cell, in response to one or more discharge signals of a charging or recharging sequence, operation or cycle, is provided to and/or stored in the storage device, according to at least certain aspects of certain embodiments of the present inventions, wherein in the illustrative embodiment of FIG. 1I, electrical energy is selectively provided to: (i) an energy storage device (for example, a capacitor and/or another battery/cell), which stores energy output, generated or provided by the battery/cell and (ii) a heating device, which is configured and adapted to heat to the battery/cell and/or the ambient environment.

Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For example, the exemplary embodiments illustrated in FIGS. 1A-1F (and discussed above) may be integrated or combined. (See, for example, FIGS. 1G-1I). In sum, all combinations and/or permutations are intended to call within the scope of the present inventions.

Many modifications, variations combination and/or permutations are possible in light of the above teaching. For example, although the exemplary embodiments and/or techniques are described and/or illustrated in the context of circuitry for and techniques for recharging batteries including a lithium ion technology/chemistry based battery (for example, lithium-cobalt dioxide, lithium-manganese dioxide, lithium-iron phosphate, and lithium-iron disulfide). The present inventions described and/or illustrated herein may also be implemented in conjunction with other electrolyte battery chemistries/technologies including, for example, nickel-cadmium and other nickel metal hydride chemistries/technologies. As such, the discussions in the context of lithium ion based batteries are merely exemplary; and other electrolyte battery chemistries/technologies, implementing one or more of the features of the present inventions as described herein, are intended to fall within the scope of the present inventions. Thus, it is to be understood that other embodiments may be utilized and operational changes may be made without departing from the scope of the present inventions. As such, the foregoing description of the exemplary embodiments of the inventions has been presented for the purposes of illustration and description. It is intended that the scope of the inventions not be limited solely to the description above. Notably, a "circuit" means, among other things, a single component (for example, electrical/electronic) or a multiplicity of components (whether in integrated circuit form, discrete form or otherwise), which are active and/or passive, and which are coupled together to provide or perform a desired operation. In addition, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays.

Further, as noted above, control circuitry may perform or execute one or more applications, routines, programs and/or data structures that implement particular methods, techniques, tasks or operations described and illustrated herein. The functionality of the applications, routines or programs may be combined or distributed. In addition, the applications, routines or programs may be implementing by the control circuitry using any programming language whether now known or later developed, including, for example, assembly, FORTRAN, C, C++, and BASIC, whether compiled or uncompiled code; all of which are intended to fall within the scope of the inventions.

Moreover, control circuitry may share circuitry with other devices and/or circuitry (for example, monitoring circuitry). Moreover, such circuitry may be distributed among a plurality of integrated circuits which may also perform one or more other operations, which may be separate and distinct from that described herein.

Notably, a "circuit" means, among other things, a single component (for example, electrical/electronic) or a multiplicity of components (whether in integrated circuit form, discrete form or otherwise), which are active and/or passive, and which are coupled together to provide or perform a desired operation. In addition, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

In addition, at times, terms battery and cell have been employed interchangeably to mean an electrical storage device that may be electrically charged and discharged. Such a device may include a single electrical cell, or may include several cells electrically connected in series and/or parallel to form a battery of larger electrical capacity. It shall be noted that the embodiments for adaptive charging described above shall apply to either cells or batteries, as a single unit or multiple units electrically configured into a larger battery pack.

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a fabrication process.

Moreover, the various circuits and circuitry, as well as techniques, disclosed herein may be represented via simulations using computer aided design and/or testing tools. The simulation of the charging circuitry, control circuitry and/or monitoring circuitry, and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive charging circuitry, control circuitry and/or monitoring circuitry, and/or techniques implemented thereby, and, as such, are intended to fall within the scope of the present inventions. The computer-readable media corresponding to such simulations and/or testing tools are also intended to fall within the scope of the present inventions.

In the claims, the term "battery" means an individual cell (which stores energy) and/or a plurality of cells arranged electrically in a series and/or parallel configuration.

Notably, the terms "first," "second," and the like, herein do not denote any order, quantity, or importance, but rather are used to distinguish one element from another. Moreover, in the claims, the terms "a" and "an" herein do not denote a limitation of quantity, but rather denote the presence of at least one of the referenced item.

What is claimed is:

1. A method to charge a battery, wherein the battery includes at least two terminals, the method comprising:
    charging the battery via a charging sequence having a plurality of charge pulses and a plurality of discharge pulses, wherein charging the battery includes:
    applying electrical energy into the battery, via the plurality of charge pulses, during the charge sequence, and
    removing electrical energy from the battery, via the plurality of discharge pulses, during the charging sequence;
        applying the electrical energy removed from the battery during the charging sequence to a heating device that is thermally coupled to the battery;
        generating thermal energy, via the heating device, using the electrical energy output by the battery during the charging sequence; and
    applying the thermal energy to the battery during the charging sequence to increase the temperature of the battery during the charging sequence.

2. The method of claim 1 wherein the plurality of charge pulses and the plurality of discharge pulses and arranged in a plurality of periodic charge packets wherein each charge packet includes at least one charge pulse and at least one discharge pulse.

3. The method of claim 1 wherein applying the thermal energy to the battery during the charging sequence includes directly applying the thermal energy to the battery during the charging sequence.

4. The method of claim 1 further including:
    monitoring the temperature of the battery; and
    applying the electrical energy removed from the battery during the charging sequence to the heating device while temperature of the battery is below a predetermined value.

5. The method of claim 1 further including determining if temperature data relating to the battery is below a predetermined value and, in response thereto, applying the electrical energy output by the battery during the charging sequence to a heating device.

6. The method of claim 5 wherein the temperature data is a temperature of the battery.

7. The method of claim 1 wherein terminating the application of the electrical energy removed from the battery during the charging sequence to the heating device when the battery is at a given temperature.

8. The method of claim 1 wherein the thermal energy is convection type thermal energy or conduction type thermal energy.

9. An apparatus to charge a battery via a charging sequence having a charge signal and discharge pulses, wherein the battery includes at least two terminals, the apparatus comprising:

a current source, electrically and responsively coupled to the battery, to generate a charge signal during the charging sequence and apply the charge signal to the battery to input electrical energy into the battery during the charging sequence;

a heating device, thermally coupled to the battery during the charging sequence, to receive electrical energy output by the battery during a first plurality of discharge pulses of the charging sequence and, in response, to generate thermal energy which is applied to the battery to increase the temperature of the battery during the charging sequence;

a first switch, electrically coupled to the battery and the heating device, to electrically connect the heating device to the battery during the first plurality of discharge pulses of the charging sequence wherein, in response, the battery outputs the electrical energy to the heating device during the charging sequence; and control circuitry, coupled to the first switch, to control the operation of the first switch during the charging sequence.

10. The apparatus of claim 9 wherein the heating device includes a resistor which is physically coupled to the battery.

11. The apparatus of claim 9 wherein the control circuitry electrically de-couples the heating device from the battery, via the first switch, when the charging circuitry applies the charge signal to the battery during the charge sequence.

12. The apparatus of claim 9 further including monitoring circuitry, coupled to the control circuitry, to generate data representative of a temperature of the battery and wherein the control circuitry:

couples the battery to the heating device, via the first switch, during the first plurality of discharge pulses of charging sequence if the temperature of the battery is below a predetermined value; and de-couples the battery from the heating device, via the first switch, during a second plurality of discharge pulses of charging sequence if the temperature of the battery is above a predetermined value.

13. The apparatus of claim 9 wherein, when the charging circuitry applies the charge signal to the battery during the charging sequence, the control circuitry (i) de-couples the battery from the heating device, via the first switch, and (ii) couples the current source to the battery via a second switch.

14. An apparatus to charge a battery via a charging sequence having a plurality of charge pulses and discharge pulses, wherein the battery includes at least two terminals, the apparatus comprising:

a current source, electrically and responsively coupled to the battery, to generate a plurality of charge pulses during the charging sequence and apply the plurality of charge pulses to the battery to input electrical energy into the battery during the charging sequence;

a heating device, thermally coupled to the battery during the charging sequence, to receive electrical energy output by the battery during a first plurality of discharge pulses of the charging sequence and, in response, to generate thermal energy which is applied to the battery to increase the temperature of the battery during the charging sequence;

a first switch, electrically coupled to the battery and the heating device, to electrically connect the heating device to the battery during the first plurality of discharge pulses of charging sequence wherein, in response, the battery outputs electrical energy associated with the first plurality of discharge pulses to the heating device;

a second switch, electrically coupled to the battery and the current source, to electrically connect the battery to the current source during the charging sequence wherein, in response, the current source applies the current pulses to the battery; and control circuitry, coupled to the second circuitry, to control the operation of the first and second switches during the charging sequence.

15. The apparatus of claim 14 wherein each discharge pulse of the first plurality of discharge pulses is a portion of a periodic charge packet which includes at least one charge pulse and at least one discharge pulse.

16. The apparatus of claim 14 wherein the heating device includes a resistor which is physically coupled to the battery.

17. The apparatus of claim 14 further including monitoring circuitry, coupled to the control circuitry, to generate data representative of a temperature of the battery and wherein the control circuitry couples the battery to the heating device, via the first switch, during the first plurality of discharge pulses of charging sequence if the temperature of the battery is below a predetermined value.

18. The apparatus of claim 14 wherein the control circuitry controls the first switch to connect the battery to the heating device if the temperature of the battery is below a predetermined value and wherein the heating device generates thermal energy during the first plurality of discharge pulses of the charging sequence.

19. The apparatus of claim 14 further including monitoring circuitry, coupled to the control circuitry, to generate data representative of a temperature of the battery and wherein the control circuitry:

couples the battery to the heating device, via the first switch, during the first plurality of discharge pulses of charging sequence if the temperature of the battery is below a predetermined value; and de-couples the battery from the heating device, via the first switch, during a second plurality of discharge pulses of charging sequence if the temperature of the battery is above a predetermined value.

20. The apparatus of claim 19 wherein the heating device includes a resistor which is physically coupled to the battery.

21. The method of claim 1, wherein the electrical energy applied to a heating device is applied through a switch that electrically couples the battery and the heating device.

22. The method of claim 21, wherein operation of the switch during the charging sequence comprises:

electrically coupling, via the switch, the battery to the heating device if the temperature of the battery is below a predetermined value; and electrically de-coupling, via the switch, the battery from the heating device if the temperature of the battery is above the predetermined value.

* * * * *